(12) United States Patent
Donath et al.

(10) Patent No.: US 7,720,635 B2
(45) Date of Patent: May 18, 2010

(54) DETERMINATION OF THE CONNECTED HEATING LOAD OF A BUILDING

(75) Inventors: Martin Donath, Am Rondell 6, 18211 Nienhagen (DE); Knut Hoyer, Villingen-Schwenningen (DE)

(73) Assignees: Martin Donath, Nienhagen (DE); Testo AG, Lenzkirch (DE)

(*) Notice: Subject to any disclaimer, the term of this patent is extended or adjusted under 35 U.S.C. 154(b) by 722 days.

(21) Appl. No.: 10/590,164
(22) PCT Filed: Feb. 11, 2005
(86) PCT No.: PCT/EP2005/001397
§ 371 (c)(1),
(2), (4) Date: Mar. 26, 2007
(87) PCT Pub. No.: WO2005/085784
PCT Pub. Date: Sep. 15, 2005

(65) Prior Publication Data
US 2007/0235550 A1    Oct. 11, 2007

(30) Foreign Application Priority Data
Feb. 20, 2004 (DE) .................. 10 2004 008 521

(51) Int. Cl.
F23N 5/24 (2006.01)
G05B 15/00 (2006.01)
G05B 21/00 (2006.01)
G06F 19/00 (2006.01)
G06F 17/40 (2006.01)

(52) U.S. Cl. ............ 702/182; 73/865.9; 165/11.1; 165/200; 236/1 A; 236/1 H; 431/2; 431/13; 700/28; 700/276; 700/299; 700/300; 702/187; 702/189

(58) Field of Classification Search .......... 73/432.1, 73/865.8, 865.9; 126/19.5; 165/11.1, 200, 165/201, 202; 236/1 R, 1 A, 1 H; 431/2, 431/13, 356; 700/1, 38, 32, 33, 90, 275, 700/276, 299, 300, 28; 702/1, 127, 182, 702/187, 188, 189
See application file for complete search history.

(56) References Cited

U.S. PATENT DOCUMENTS 1,730,541 A * 10/1929 Spitzglass ................ 73/113.01

(Continued)

FOREIGN PATENT DOCUMENTS

DE    27 53 485 A1    6/1978

(Continued)

OTHER PUBLICATIONS

DIN 4701/VDI 2067, German Institute for Standardization (DIN), 5 pp.
First German Federal Emission Protection Decree [*Erste Verordnung zur Durchführung des Bundes-Immissionsschutzgesetzes*] (1.BImSchV), 1988, 19 pp.

* cited by examiner

*Primary Examiner*—Edward R Cosimano
(74) *Attorney, Agent, or Firm*—Muirhead and Saturnelli, LLC

(57) ABSTRACT

A method and device, wherein the following steps are carried out: measurement or determination of waste gas concentration parameters, waste gas temperature, outside temperature, fuel power during a limited observation period; determination of the efficiency of the heating system in the area of observation over a period of time; determination of the average outside temperature in the area of observation; determination of heating performance produced in accordance with an average outside temperature on the basis of fuel power over a period of time and the efficiency of the heating system over a period of time in the area of observation; determination of maximum heating performance which is to be obtained in accordance with a minimum outside temperature from the average heating performance, minimum outside temperature, average inside temperature and average outside temperature in the area of observation; determination of the heat contact value of the heating system from the maximum heating performance and duration of observation.

51 Claims, 2 Drawing Sheets

U.S. PATENT DOCUMENTS

| | | | | |
|---|---|---|---|---|
| 2,252,367 A | * | 8/1941 | Germer | 73/196 |
| 2,252,369 A | * | 8/1941 | Germer | 73/196 |
| 2,883,255 A | * | 4/1959 | Anderson | 346/34 |
| 3,202,804 A | * | 8/1965 | Helmar | 702/182 |
| 4,054,408 A | | 10/1977 | Sheffield et al. | |
| 4,355,908 A | * | 10/1982 | Weisser et al. | 374/39 |
| 4,362,499 A | * | 12/1982 | Nethery | 431/12 |
| 4,621,528 A | | 11/1986 | Alt et al. | |
| 4,749,122 A | * | 6/1988 | Shriver et al. | 236/14 |

FOREIGN PATENT DOCUMENTS

| | | |
|---|---|---|
| DE | 36 26 281 C1 | 2/1988 |
| DE | 37 30 529 A1 | 3/1988 |
| DE | 100 30 294 A1 | 1/2002 |
| DE | 100 57 834 C2 | 6/2002 |
| DE | 100 62 581 A1 | 7/2002 |
| GB | 1 562 536 | 3/1980 |

DETERMINATION OF THE CONNECTED HEATING LOAD OF A BUILDING

TECHNICAL FIELD

The present invention relates to a method and a device for determining the connected heating load (also known as the heating load) of a building heated by a heating system, the heating system being fired by fuel in a waste gas-generating manner and an outside temperature as well as an inside temperature occurring for the building.

BACKGROUND OF THE INVENTION

The efficient use of energy is urgently needed from an economical and ecological perspective. Energy conservation is therefore a measure for both lowering costs and protecting the environment, and it can be achieved either by cutting energy use or through intelligent technical solutions. The energy-related and environmental performance of heating boilers has a great deal to do with this issue. Up to now, evaluations of energy efficiency were based mainly on static approaches. However, the interaction between the system and building is dynamic. As a result, the efficiency specified by heating boiler manufacturers deviates substantially in many cases from the degree of utilization achieved during operation in practice.

This is due, among other things, to the fact that systems of this type were frequently overdimensioned due to a false understanding of "the need for safety and comfort." This applies not only to private systems, but to a large extent also to buildings used for public and commercial purposes. The consequence of this overdimensioning is that the thermal systems are operated in uneconomical partial load situations for most of the heating period. This unsatisfactory situation results in the need to determine the actual heat requirements of a building to be heated to improve the building's energy efficiency so that the heating system can be optimally adapted thereto.

Up to now, the energy efficiency for heating an existing building has usually been ascertained as follows: The building to be subjected to an energy evaluation is assigned to its year of origin according to a typology. Based on plans or an inspection, the area is surveyed to ascertain the building geometry. The corresponding heat transfer coefficients are ascertained through comparison with flat-rate figures from a component catalog. Using existing software programs, the transmission and ventilation heat losses are calculated on the basis of this data, and these losses are used to calculate the heat demand. System efficiency is calculated on the basis of a heating system catalog, the energy efficiency being concluded in the evaluation from the system technology used and the year of construction. Based on the data ascertained in this manner, an overall assessment with regard to final energy demand, primary energy demand, and $CO_2$ emissions is drawn up, and the building is placed on a rating scale.

This method is controversial due to the somewhat subjective evaluation factors, resulting in the need for a method based on an objective foundation.

The more the installed power deviates from the connected load of the building (overdimensioning), the farther removed from the optimum the energy efficiency of a heating system becomes. The determination of the connected load of the building therefore performs a key function in improving energy efficiency. In the case of heating, the connected load of the building is the maximum heat loss of the building and is calculated for the lowest local statistical outside temperature according to regulation DIN 4701/VDI 2067.

Heating systems are configured, i.e., engineered, with respect to this connected heating load. The installed power (nominal power) is sufficient to equalize the building's transmission and ventilation losses with continuous prevalence of the design temperature, taking wind conditions into account. The power needed to provide hot water is added to this value. The specific user behavior is, in principle, not taken into account.

Methods for determining the connected load via metrology have occasionally been used which calculate this connected load by measuring heat flow, but without providing a statement on ways to optimize a system. In addition, patent applications have been filed for methods which, in part, integrate the boiler's fuel performance into the calculation. In the case of these methods, however, the unsteady behavior of a heating system caused by cycling or modulating the boiler is ignored or not adequately considered. This unsteady behavior occurs when the power requirement lies below the installed power, thus determining the gap between the actual degree of utilization and the efficiency defined by the manufacturer or measured at certain points by waste gas analysis equipment.

A method is known from DE 3 730 529 A1 for measuring a dimensional characteristic of a heating unit of a heating system defined by the ratio between the setpoint capacity utilization and the actual capacity utilization, in which the heat demand is determined by measuring the setpoint capacity utilization via measurement of the outside temperature at constant time intervals, forming an average value and multiplying it by a climate factor, as well as by simultaneously measuring the actual capacity utilization via continuous measurement of the switch-on period of the heating unit in relation to the preset minimum measuring time. The disadvantage of this method is that it requires a "measuring boiler," which necessitates an extremely complex installation.

A method is known from DE 3 626 281 C2, in which the heat quantity is ascertained by a heat generator being used which has a high degree of efficiency. An observation period is divided into individual measuring periods, and the setpoint number of operating hours of the high-efficiency heat generator is related to the measuring period as a function of the outside temperature. The heat quantity transferred to the heated object within the observation period by the heat generator being used is then calculated from the nominal power thereof, taking into account the boiler efficiency and standby losses, as well as from the actual number of operating hours. The nominal power, in turn, is determined for a heat generator adjusted to the heat demand, using the quotient of the actual number of operating hours and setpoint number of operating hours. Although this method does not require such intensive intervention into the heating system as does the aforementioned DE 3 730 529 A1, numerous assumptions are nevertheless made which relate only to one average case, so that the ascertained heat demand may again deviate substantially from the actual heat demand. For example, only the boiler efficiency, which is ascertained once by the manufacturer, is used as a basis.

A method is known from DE 100 62 581, in which the outside temperature and a variable which is characteristic for an energy output of the heat source to the heating system are measured as a function of time, and the nominal heat demand is calculated from the measured values. However, the calculation of the energy output of the heat source is also based on different assumptions which distort an accurate determination of the actual energy output.

Accordingly, it may be desirable to specify a method and a system of the type mentioned above which does not have these disadvantages.

SUMMARY OF THE INVENTION

According to the present invention, an advantage of the system described herein is that the actual degree of utilization is included in the calculations of the heat performance transferred from the heating system to the building, in particular as a function of the operating behavior. The present invention is based on the understanding that the efficiency may fluctuate greatly over time. According to the present invention, the degree of utilization is precisely detected over time as the efficiency or losses of the heating system and evaluated via the variables measured synchronously over a certain observation period. This makes the ascertained connected heating load largely independent of dynamic influences. The connected heating load ascertained according to the present invention is therefore much more accurate than in all known methods.

By taking the degree of utilization into account according to the present invention, the connected load and, by extension, the energy efficiency of a heating system, may be correctly determined if the instantaneous fuel power is included in the calculation. The annual heating demand may be calculated from the connected heating load. In continuation of the calculation, the annual primary energy demand is also ascertainable from the energy carriers used.

The system according to the present invention is distinguished from the known methods as follows:

The system may have a mobile design and work without intervention into the installation itself.

The installed equipment (e.g., boiler) is used as a data source via sensors.

In the event that the autonomous heating of the building is carried out via a boiler, the degree of utilization is computed from the differentiated analysis of the number and type of startup operations and partial load situations of the heating boiler, using discrete instantaneous recordings.

This system also makes it possible to obtain specific information about the transmission and ventilation heat losses of the building and the heat losses caused by user behavior.

Based on the connected heating load ascertained through metrology, the system enables objective characteristics to be provided for preparing an energy certificate, such as calculating the annual energy demand.

The method enables the system to be evaluated for the purpose of optimizing operating behavior, improving the system configuration, and changing user behavior.

The system is expandable with regard to future building diagnostic requirements by integrating additional measurement variables or processing and interpreting measured data.

The inclusion of the boiler's unsteady behavior to ascertain the connected heating load via metrology and calculation methods also substantially improves accuracy. In particular, this is achieved through the following steps:

Fuel power, inside temperature (for example, constant) and combustion air temperature (for example, constant and/or equal to inside temperature) are ascertained, i.e., assumed, calculated or measured, over time in each case within an observation period of a certain observation duration. Waste gas concentration parameters, waste gas temperature, and outside temperature are also measured over time in each case within this observation period of a certain observation duration. A time-dependent (in particular, real time-dependent, i.e., precisely synchronous) measurement of the aforementioned variables provides a clear assignment of the individual variables to one another over time, so that variables calculated therefrom, such as the efficiency of the heating system, may also be calculated as a function of time, i.e., assignable to each individual point in time and/or the same points in time.

The efficiency of the heating system over time is calculated from the time-dependent variables of waste gas concentration parameters, waste gas temperature, and combustion air temperature within the observation period as well as any other variables such as fuel-dependent parameters, so that a variation in efficiency over time is obtained. Other parameters, such as CO concentration, etc., may also be measured and used for calculation purposes.

Furthermore, the average outside temperature within the observation period is ascertained from the variation in outside temperature over time. An average heating performance produced at the average outside temperature is ascertained from the variation in the efficiency of the heating system over time and the fuel power over time. This provides a statement on which average heating performance has been produced at which average outside temperature.

A maximum heating performance to be produced at a minimum average outside temperature (e.g., lowest two-day average) is determined from the average heating performance at the average outside temperature within the observation period, taking into account the heating limiting temperature or average inside temperature within the observation period or a preset inside temperature. Extrapolating the average heating power at an average outside temperature to a maximum heating power at a minimum outside temperature is a practical way to achieve standardization, so that the maximum heating power is comparable to other values. A common value for the minimum outside temperature is −15° C., a temperature of 12° C., for example, being assumed as the maximum permissible outside temperature at which the connected heating load may reasonably be determined.

The connected heating load (capacity value or heating load) of the building is finally calculated from the maximum heating performance and the observation duration. The latter is very precise, due to the strictly synchronous, time-dependent measured value acquisition and evaluation.

In the method described above, the carbon dioxide concentration in the waste gas or the oxygen concentration in the waste gas may be used as a basis for the waste gas concentration parameters. Both concentrations are easily determined using conventional metrology.

Efficiency $\eta_K$ of the heating boiler is preferably ascertained, for example, on the basis of the following equation:

$$\eta_K = 1 - q_{wg}/100 \text{ (wg=waste gas)}$$

or, in %:

$$\eta_K(\%) = 100 - q_{wg}$$

$$q_{wg} = (T_{wg} - T_{air,\,actual}) \cdot ((\text{Coeff}\,A_2/(21 - O_{2meas}) + \text{Coeff}\,B)/100)$$

from which follows:

$$\eta_K = 1 - (T_{waste\,gas,\,actual} - T_{air,\,actual}) \cdot ((\text{Coeff}\,A_2/(21 - O_{2meas}) + \text{Coeff}\,B)/100)$$

$O_{2,\,meas}$ represents the instantaneous oxygen concentration in the waste gas, $T_{waste\,gas,\,actual}$ the instantaneous waste gas temperature, $T_{air,\,actual}$ the instantaneous combustion air temperature and Coeff $A_2$, Coeff B fuel-dependent coefficients characterizing the fuel power. For example, if oil or gas is used as the fuel, coefficient Coeff $A_2$ ranges between 0.63 and 0.68, and coefficient Coeff B between 0.007 and 0.0011. The efficiency calculation may be carried out in a number of different ways and is, in particular, country-specific. While the above equation is used in Germany, the calculation is carried out as follows in the UK:

$$\eta_K = 100 - (K_{gr} \cdot (T_{waste\ gas,\ actual} - T_{air,\ actual})/CO_{2,\ actual}) + (X(2488 + 2.1 \cdot T_{waste\ gas,\ actual} - 4.2 \cdot T_{air,\ actual})/(1000 \cdot Q_{gr}),$$

where $K_{gr}$, X and $Q_{gr}$ are fuel-specific parameters. A general approach (known as the Siegert formula) is as follows:

$$\eta_K = 100 - (f((T_{waste\ gas,\ actual} - T_{air,\ actual})/CO_{2,\ actual}),$$

where f in this case is a fuel-specific parameter. In all equations shown and not shown for calculating the efficiency, the carbon dioxide concentration may, of course, be replaced by a converted oxygen concentration and vice versa.

The average heating performance may be ascertained from the product, integrated over the observation period, of fuel power over time and efficiency over time. In a simplified manner, for example, the following equation may be used:

$$Q_{heating,\ average} = P_{Br,\ actual} \eta_K \tau$$

The maximum heating performance may then be calculated from the average heating performance, resulting in:

$$Q_{heating,\ max} = Q_{heating,\ average} \cdot (T_{heating\ limit} - T_{outside,\ min})/(T_{heating\ limit} - T_{outside,\ average})$$

where $Q_{heating,\ max}$ represents the maximum heating performance, $Q_{heating,\ average}$ the average heating performance within the observation period, $T_{heating\ limit}$ the heating limiting temperature (for example 15° C.) or the average inside temperature (for example, 20° C.) within the observation period, $T_{outside,\ min}$ the minimum outside temperature and $T_{outside,\ average}$ the average outside temperature, measured to determine the connected heating load, within the observation period.

Connected heating load P may then be ascertained on the basis of the equation $P = Q_{heating,\ max}/\tau$, where $Q_{heating,\ max}$ represents the maximum heating performance and $\tau$ the observation duration.

Observation duration $\tau$ is preferably 24 hours or an integral multiple of 24 hours, so that typical different outside temperatures as well as different operating states, such as, in particular, a reduction at night, may be taken into account. In defining the observation duration (measurement and calculation period), it is assumed that the building is subject to more or less identical 24-hour cycles during a normal state of use. In the event of a constant operating behavior of the system or less strict accuracy requirements, shorter measurement and calculation periods may be defined, for example one-hour cycles. In this case, the shortened cycles may again be extrapolated to a 24-hour cycle, and the described calculation operation is continued in the same manner.

In the event of stricter accuracy requirements or variable 24-hour cycles, multiple cycles, weekly, monthly or annual cycles may be used as the measurement and calculation period, as a function of the typical operating states of a building (e.g., seasons such as winter, transitional period, summer, or states of use such as in used, unused, or climate situations such as sunny, cloudy).

Carrying out measurements at different average outside temperatures makes it possible to very accurately ascertain the building characteristic, characterized by the outside temperature-dependent heating power, connected heating load, and object-related real heating limit temperature.

An observation duration of 168 hours, which corresponds to one week, is also suitable, so that a special behavior over the weekend may also be detected.

If existing measured data or system-integrated, readable signal transmitters for the energy-relevant data such as temperatures, burner operating hours, burner state variables, waste gas concentration parameters are used, the data may also be recorded via the readable signal transmitters of the system or, combined therewith, on a one-time metrologically short-term or metrologically discontinuous basis to detect the typical operating behavior of the system.

This additional data acquisition, for example, from the burner controller or system regulator, may also be recorded or processed, for example, over a 24-hour period.

If the heating system has a hot water supply, the heating performance for the hot water supply may also be taken into account accordingly to determine the connected heating load in the case of the average heating performance.

The average inside temperature of the building may either be set to a specific value (for example 20° C.) or measured and averaged. If the outside temperature enters the range of inside temperature, little or no heating power is needed, and a reasonable measurement of the connected heating load is therefore not possible ($T_{outside,\ measurement\ limit}$, see FIG. 2).

To calculate the connected heating load, the instantaneous fuel flow over time is ascertained or measured. The fuel performance may be calculated on the basis of the equation $Q_{Br,\ actual} = H_U \cdot V_{BG}$, where $Q_{Br,\ actual}$ represents the fuel performance, $H_U$ a fuel-dependent heating value and $V_{BG}$ the fuel flow. The fuel flow may be ascertained without intervention into the heating system, for example, by interrogating the instantaneous consumption using existing measuring instruments.

The measurement at least of the waste gas concentration parameters, waste gas temperature, and outside temperature and, if applicable, the fuel performance (for example via the burner time behavior, as explained below) is preferably carried out synchronously and discretely at certain measuring times, i.e., measuring intervals. At the individual measuring times, i.e., measuring intervals, whose time distance is much shorter (for example, in the range of seconds) than the observation period (for example, in the range of days), measured data records are obtained which may be easily further processed and, in particular, easily buffered. For example, the integration may be carried out discretely as a simple summation.

If the burner is also cycled, which is usually the case, the variation over time and/or the instantaneous values of waste gas concentration parameters and/or waste gas temperature may be used to determine whether or not the heating system is currently in operation. The operating time of the heating system may be ascertained by a special evaluation of the existing measured data. Switching between the individual stages may also be evaluated via changes in and/or exceeding or dropping below absolute limiting values.

In the case of the method for determining the connected heating load of a building heated by a heating system, very accurate results are obtained if the essential heat generation losses caused by the dynamic operating behavior are taken into account when determining the average heating performance. By detecting the operating situation over time, average heating performance $P_h$ is determined in each "time slice" as the product of average fuel power $P_{Br}$ and average efficiency $\eta_K$. It is advisable to include the radiation heat losses in the ascertainment of efficiency $\eta_K$ of the heating system when the boiler is completely or partially outside the thermal envelope. The heat radiation losses are produced by heat transfer over the surface of the boiler.

Radiation heat losses $q_{AStr}$ include radiation energy losses $q_{S, V}$ and convection energy losses $q_{K, V}$:

$$q_{AStr} = q_{S,V} + q_{K,V}$$

Where:

$$q_{AStr} = \int \alpha_s \cdot A(T_K - T_U) \cdot dt + \int \alpha_K \cdot A(T_K - T_U) \cdot dt$$

or, for metrological reasons, for the sum of losses z averaged over time:

$$q_{AStr} = \sum_{l}^{z} \alpha_S \cdot A(T_{K,average,z} - T_{U,average,z}) \cdot \Delta t +$$

$$\sum_{l}^{z} \alpha_K \cdot A(T_{K,average,z} - T_{U,average,z}) \cdot \Delta t$$

or $$q_{AStr} = \sum_{l}^{z} (\alpha_S + \alpha_K) \cdot A(T_{K,average,z} - T_{U,average,z}) \cdot \Delta t$$

Where:

| | | |
|---|---|---|
| $q_{AStr}$ = | "Radiation heat loss" | in [kWh] |
| $q_{S, V}$ = | Radiation energy loss | in [kWh] |
| $\alpha_S$ = | Radiation heat transfer coefficient for boiler surface | in [W/m²K] |
| $q_{K, V}$ = | Convection energy loss | in [kWh] |
| $\alpha_K$ = | Heat transfer coefficient for boiler surface | in [W/m²K] |
| A = | Boiler surface | in [m²] |
| T = | Time | in [h] |
| $T_K$ = | Temperature of boiler surface | in K. or ° C. |
| $T_U$ = | Room temperature of boiler surroundings | in K. or ° C. |

The sensor system is used to ascertain the following synchronously over time:

| | | |
|---|---|---|
| $T_K$ = | Temperature of boiler surface | in K. or ° C. |
| $T_U$ = | Room temperature of boiler surroundings | in K. or ° C. |

The material constants $\alpha_{K, V}$, $\alpha_{S, V}$ and boiler surface A are taken from data sheets or ascertained.

To achieve more accurate results, start-up loss performance $Q_{loss, startup}$ should also be included in the calculation of average heating performance $Q_{d, actual}$ by subtracting this loss from average fuel performance $Q_{Br}$ for the entire burner runtime in the quasistationary range.

In mathematical terms, this is expressed as:

$$Q_{d, actual} = Q_{Br} - Q_{loss, startup}$$

Startup loss performance $Q_{loss, startup}$ may be divided into a heatup loss performance $Q_{loss}$ (KS) in the case of a cold start of the heating system, and a heatup loss performance $Q_{loss}$ (WS) in the case of a warm start of the heating system.

This yields the following for the average heating performance of the heating system:

$$Q_{d, actual} = Q_{Br} - Q_{loss}(KS) - Q_{loss}(WS)$$

After a prolonged cooling phase, the waste gas temperature at the startup time is lower than the boiler water temperature. This is also true for the cold start, which initiates both a "heating cycle" and a "standby cycle." During the cold start phases, the entire fuel performance is needed to return to the starting point of the heat transfer from waste gas to boiler water or to the heating section. The fuel performance needed up to that point is included in the calculation of the average heating performance entirely as heatup loss performance $Q_{loss}$ (KS). In the case of a cold start, the heatup loss performance is therefore calculated as follows:

$$Q_{loss}(KS) = P_{Br} \cdot t_{heatup}$$

where $t_{heatup}$ is the cold start phase duration and $P_{Br}$ the fuel power.

In a warm start phase, on the other hand, the waste gas temperature at the startup time is higher than the boiler water temperature. In a warm start phase, the portions of the waste gas loss for incomplete combustion, as opposed to an exclusively temperature-related waste gas loss, must be taken into account, so that uncombusted components must usually be included when calculating efficiency $\eta_{loss\ (CO)}$. This is true, in principle, for a concentration of CO>0.1%.

Heatup loss performance $Q_{loss}$ (WS) during a warm start phase is thus calculated as follows:

$$Q_{loss}(WS) = \Sigma t_{start}(CO_{waste\ gas} > 0.1\%) \cdot P_{Br} \cdot \eta_{loss(CO)}$$

where $t_{Start}$ is the warm start phase duration and $P_{Br}$ the fuel power.

If the heating system includes two or more combustion stages of varying fuel power values, the variation over time and/or the instantaneous values of waste gas concentration parameters and/or waste gas temperature may be used to determine which of the at least two combustion stages is currently in operation and which fuel power must therefore be instantaneously applied in determining the connected heating load. The combustion stage actually in operation may be detected, for example, on the basis of the rise in waste gas concentration parameters and/or on the basis of the waste gas temperature, or alternatively or in addition on the basis of absolute values which exceed certain thresholds.

A system according to the present invention includes at least one measuring device for measuring at least the waste gas concentration parameters, waste gas temperature, and outside temperature and for ascertaining or measuring the fuel power over time in each case, within an observation period. An analyzer unit is also provided which carries out all aforementioned evaluations and calculations. The measuring device and the analyzer unit may be built into a single unit, but are suitably designed in two or more parts, namely having at least one mobile measuring device (data logger) and one, for example stationary, analyzer unit. In this case, the data is collected locally and transferred to the analyzer. In the same manner, however, a remote access is also possible via which the data is transmitted continuously, at certain points in time or at the end of the observation period. The data transmission may take place wirelessly or using cables via an interface. Finally, it is also possible to operate an analyzer having multiple measuring devices for measuring multiple buildings.

BRIEF DESCRIPTION OF THE DRAWINGS

The present invention is explained in greater detail below on the basis of the exemplary embodiments illustrated in the figures of the drawing.

DETAILED DESCRIPTION OF VARIOUS EMBODIMENTS

Figure 1:
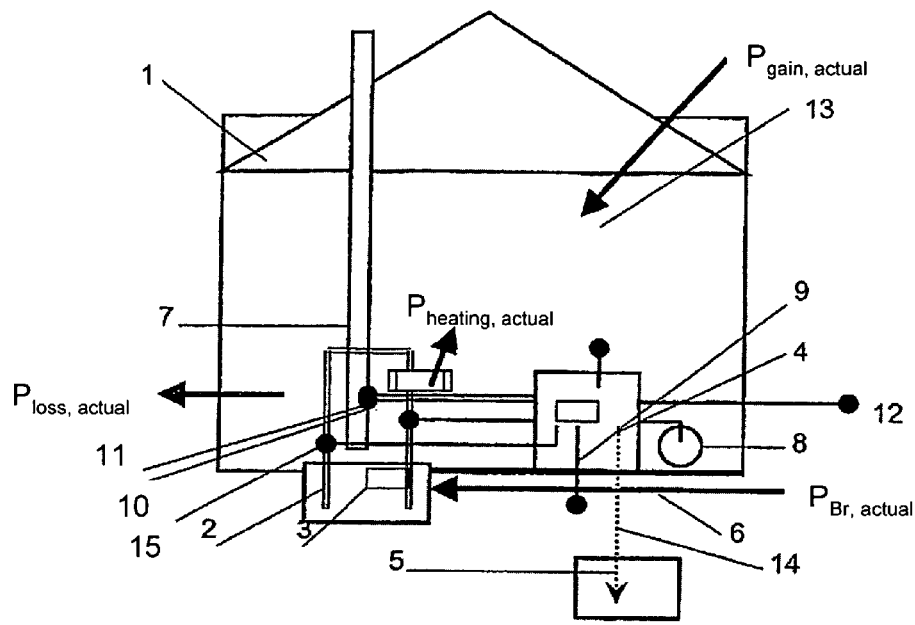
FIG. 1 shows a system according to the present invention for determining the connected heating load of a building heated by a heating system.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

In the case of the system according to FIG. 1, a heating system 2 including a boiler 3 (having a burner which is not illustrated in greater detail) is accommodated in a building 1 for the purpose of heating building 1, the heating system being fired by fossil fuel 6 such as oil or gas, or by renewable fuels such as pellets. Fuel power $P_{Br, actual}$ contained in fuel 6 is converted to a useful power $P_{heating, actual}$, the heating system having an efficiency $\eta_K$, so that useful power $P_{heating, actual}$ generated by the heating system is equal to the product of efficiency $\eta_K$ and fuel power $P_{Br, actual}$. In addition, power loss $P_{loss, actual}$ is withdrawn from building 1, for example due to transmission and ventilation losses, etc., although the building also receives an additional internal and/or external power gain $P_{gain, actual}$, for example due to solar radiation, electrical consumers in the building, etc.

The heat demand is derived from the sum of the thermal heat and the process water heat. To assess systems which have a substantial process water demand (for example, public swimming pools, production plants having technological heat consumption, etc.), the process water demand must be evaluated separately.

It is first assumed that boiler 3 produces, within an observation period (for example, 24 hours), a heat performance which includes the useful power and burner runtime. The heat performance produced is identical to the heat loss performance which occurs during the same period and is dependent, for example, on the outside and inside temperatures. According to the present invention, the fact that the boiler of the heating system is not operated at a constant efficiency during the burner operating periods is taken into account.

A data acquisition and evaluation process according to the present invention reveals how often the boiler is "cycled," in which stage the boiler is operating and whether an approximately stationary state is reached for the boiler during the individual work cycles. The data ascertained in this manner may be used to determine the minimal uncertainty of the connected heating load of the heat consumers, resulting from the method and dependent on the outside temperature, when the heating boiler operates in regular heating mode. This requires the building to be operated in a manner which corresponds to normal usage patterns during the observation period. A measuring device according to the present invention measures, at short time intervals (for example, in ten-second intervals), the parameters described below within the observation period (for example, 24 hours or a multiple thereof).

Using, for example, sensors 10, 11, 12, 13, measuring device 4 may ascertain the waste gas temperature, the oxygen concentration (or alternatively the $CO_2$ concentration) in the waste gas, the outside temperature, and the inside temperature (room temperature in a reference room). The instantaneously ascertained measured value is stored in a memory 9 and transferred to analyzer unit 5 either immediately or at a later point. According to the exemplary embodiment, the date and time (real time) are recorded for each data query accurate to the second, using a timing device 8.

After the data have been collected by measuring device 4, they are transmitted wirelessly to a data analyzer unit 5, for example at the end of observation time τ. Measuring device 4 is coupled with data analyzer unit 5 via an interface 14, for example an infrared interface, an air interface or a wired interface to transfer data from measuring device 4 to data analyzer unit 5. Alternatively, measuring device 4, which in this case is provided at least with a memory 9, or only memory 9 itself may be removed from the measuring site and taken to another site where data analyzer unit 5 is located. It is also possible to collect the individual measured values using multiple measuring devices, for example, one measuring device per value. However, measuring device 4 and data analyzer unit 5 may also be located in the same place, in particular in the same unit.

To evaluate the data, the daily burner runtime is preferably also ascertained from the data recording by adding up the work cycle times. During the data evaluation, the number of times boiler 3 is started and the sum of the burner runtimes are counted for observation period τ. For this purpose, either the switch-on times of the corresponding solenoid valves in the heating system or preferably the times of low oxygen concentration (or high $CO_2$ concentration) during the burner operation may be evaluated. The same procedure is followed even if multistage burners are used, a distinction in this case also being made between the individual burner stages. Multistage burners in heating systems are achieved either by using variable-sized nozzles at the same pressure or by using one nozzle having different operating pressures.

The burner runtime may be detected either by interrogating a magnetic signal in heating system 2 or again by measuring the oxygen or carbon dioxide concentration in chimney 7. In addition, the values which additionally identify the burner startup phases, such as CO, may also be taken into account.

Studies have shown that it takes a burner of an oil-fired heating boiler, for example, 15 to 20 minutes in a cold start to achieve quasistationary operation and to reach emission values guaranteed by the manufacturer. This is expressed, among other things, in approximately time-constant waste gas temperatures and consistently low emission values. If the boiler is operated in shorter cycles, the boiler takes on operating states which deviate substantially from the stationary state and the thermotechnical optimum. According to the present invention, it is now possible to obtain information on the ratio between real efficiency under specific measurement conditions over time and efficiency measurable under stationary conditions by using the measured data described below.

For a building, there is an approximately linear correlation between thermal power loss $P_{loss}$ and the difference between inside and outside temperatures $T_{inside, actual}$ and $T_{outside, actual}$, respectively, unless extraordinary weather conditions (such as a storm) result in unusual heat losses. In this case, it is assumed that the building demonstrates static behavior.

Strong wind, temperature gradients, etc., result in a dynamic state in which, for example, the storage capacity of the building must be taken into account. Connected heating load P of the building according to maximum heat performance $Q_{d, max}$ to be produced at a minimum outside temperature $T_{outside, min}$ may then be calculated from heat performance $Q_{d,\ actual}$ ascertained by the method of measurement according to the present invention illustrated in FIG. 2 at $T_{outside,\ actual}$ for a minimum (statistical) outside temperature for the system's location. This enables statements to be made about the heat demand of the building for different minimum outside temperatures $T_{outside,\ min}$, such as −10° C., −15° C., −20° C. In addition, heat performance $Q_{w,\ actual}$ required for supplying hot water may also be taken into account.

Ascertained connected load P is more accurate if a certain statistical safeguarding of the results is carried out (e.g., by repeating the measurement multiple times under the same operating conditions or precisely ascertaining the building characteristic at different outside temperatures,) e.g.:

$1^{st}$ measurement: $T_{outside,\ min} < T_{outside.meas,\ 1} < -5°$ C.;

$2^{nd}$ measurement: $0°$ C.$< T_{outside.meas,\ 2} < 8°$ C.;

$3^{rd}$ measurement: $T_{outside,\ heating\ limit} < T_{outside.meas,\ 3}$.

In this case, $T_{outside.\ meas,\ 3}$ is the outside temperature at which only process water is heated.

The computation of the connected load is possible only if the system is actually in heating mode.

As described above, the preparation of hot water must be taken into account under certain conditions. The fact must be taken into account that the boiler does not operate in continuous mode, in particular at elevated outside temperatures, but instead "only" hot water is provided, so that the boiler contents must also be heated each time the hot water tank is filled. The energy needed to prepare hot water is usually not, or only insubstantially, dependent on the outside temperature. The heating energy performance, however, is dependent on the outside temperature.

Figure 3:
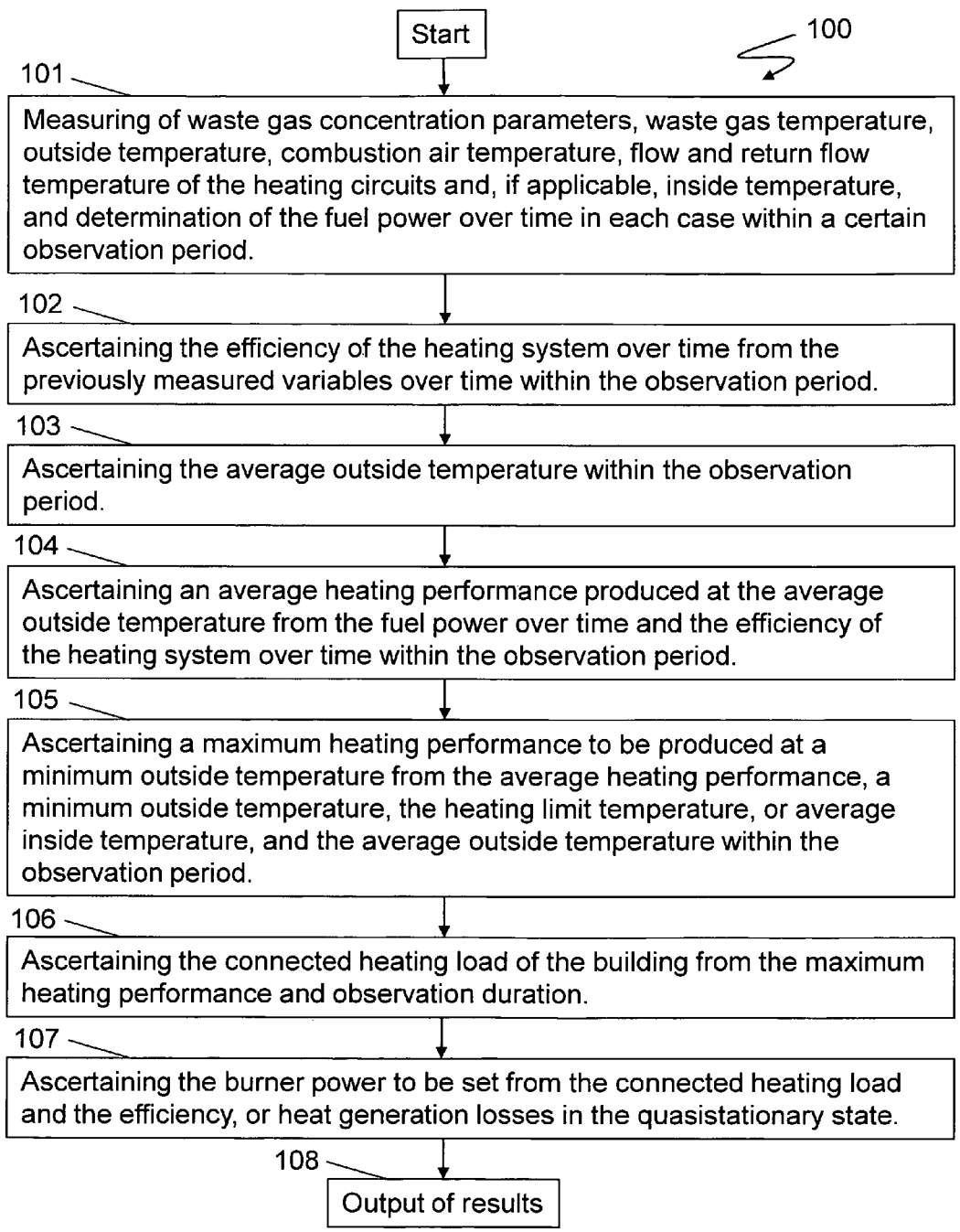
FIG. 3 shows an example of a method sequence according to the present invention.

FIG. 3 shows an example of a method sequence 100 according to the system described herein. The method sequence 100 includes a step 101 that includes the measuring of waste gas concentration parameters, waste gas temperature, outside temperature, combustion air temperature, flow and return flow temperature of the heating circuits and, if applicable, inside temperature, and determination of the fuel power over time in each case within a certain observation period. After the step 101, processing proceeds to a step 102 that includes ascertaining the efficiency of the heating system over time from the previously measured variables over time within the observation period. After the step 102, processing proceeds to a step 103 that includes ascertaining the average outside temperature within the observation period. After the step 103, processing proceeds to a step 104 that includes ascertaining an average heating performance produced at the average outside temperature from the fuel power over time and the efficiency of the heating system over time within the observation period. After the step 104, processing proceeds to a step 105 that includes ascertaining a maximum heating performance to be produced at a minimum outside temperature from the average heating performance, a minimum outside temperature, the heating limit temperature, or average inside temperature, and the average outside temperature within the observation period. After the step 105, processing proceeds to a step 106 that includes ascertaining the connected heating load of the building from the maximum heating performance and observation duration. After the step 106, processing proceeds to a step 107 that includes ascertaining the burner power to be set from the connected heating load and the efficiency, or heat generation losses in the quasistationary state. After the step 107, processing proceeds to a step 108 that includes an output of results.

In the case of the method according to the present invention and illustrated in FIG. 3, the sequence is variable within certain limits. The fuel power is first ascertained, for example, by linking the fuel flow with the switch-on stage time response or the burner stage time response, or by determining the total fuel quantity supplied during the observation period and so forth. In addition, the waste gas concentration parameters, waste gas temperature, combustion air temperature, outside temperature, and, if applicable, inside temperature are measured over time in each case within an observation period. However, individual, in particular constant, measured variables may also be determined once and used as the basis for the rest of the method.

The efficiency of the heating boiler over time is then ascertained from waste gas concentration parameters, waste gas temperature, combustion air temperature (e.g., combustion chamber temperature or outside temperature, i.e., air temperature in the intake duct), and fuel power over time in each case within the observation period. An average heating performance produced at the average outside temperature is subsequently ascertained from the fuel power over time and the efficiency of the heating system over time within the observation period. A maximum heating performance to be produced at a minimum outside temperature is then calculated from the average heating performance, the minimum outside temperature, an average inside temperature, and the average outside temperature within the observation period.

The amount of fuel supplied to the system (cost) that is converted into heating energy (benefit) is decisive for the energy assessment of a heating system, the necessary calculations being based, in particular, on the physical variables of power and performance. Energy processes are usually unsteady and dynamic, rarely stationary or static.

To detect the instantaneous operating situation of a boiler in the stationary situation, power P is preferably used as a physical variable. When power values are compared to each other as a cost/benefit ratio, this is referred to as efficiency $\eta_K$. The physical variable of performance Q is preferably used to describe unsteady situations. When performances are compared to each other as a cost/benefit ratio, this is referred to as degree of utilization $\eta_N$. In this case, $\eta_N \leq \eta_K$.

Performance is a power which lasts for a certain period of time. In the special stationary situation of time-constant power P, heat performance Q is calculated as power P times time t:

$$Q = P \cdot t$$

Since technical equipment rarely meets the condition of time-constant power, the performance must be calculated as follows:

$$Q = \int P(t) \cdot dt$$

or, for performing practical measurement tasks, prepared discretely:

$$Q = \Sigma P(t) \cdot \Delta t$$

where $\Delta t$ is the measurement interval, i.e., either the time interval between discrete measuring points, or the period over which the measurement is carried out by averaging.

The following applies to the calculation of an average power $P_{n,\ average}$ ($t_n$) in a time segment $\Delta t_n$ from performance $Q_n$ ($\Delta t_n$) in this time segment $\Delta t_n$:

$$P(t)_{average} = Q_n(\Delta t_n)/\Delta t_n \text{ where n=1, 2, ...}$$

In the approach, the boiler system is first considered in relation to the building. The thermal balance of the building is determined by the transmission and ventilation losses due to users, building envelope and climactic conditions, internal and external heat gains, as well as the heat supplied by the heating system.

External heat gains are achieved directly or indirectly, in particular by incident sunlight. Internal heat gains must be taken into account, e.g., other heat sources such as a possible internal chimney, electric consumers and/or pumps located in the heating system whose electrical energy is converted to heat. The boiler system converts the fuel energy into heat which is distributed via a medium in the building and is transferred to the ambient air (convection) or the building substance and objects or living things located therein (radiation). The untransferred heat remains in the medium. These described external and internal heat gains (for example, other heat generators and electrical energy input into the building) may also be integrated into the calculation. The electrical auxiliary energy for the heating system may simultaneously be considered as a factor for evaluating the energy efficiency of the system.

The total heat demand of the building within a defined period therefore corresponds to the heating performance to be produced by the boiler as a useful performance to equalize heat losses due to transmission and ventilation during this period. The useful performance of the boiler is the quantity of heat transferred to the heating system. It is less than the performance supplied to the boiler by the fuel. When the fuel energy is converted into heat, losses occur which may be taken into account by degree of utilization $\eta_N$.

Daily performance $Q_d$, for example for one day, i.e., 24 hours, is therefore the sum of the performance for equalizing the heat losses due to transmission and ventilation $Q_{dh}$ and the performance for hot water preparation $Q_{dw}$ on a single day.

$$Q_d = Q_{dh} + Q_{dw},$$

where $Q_{dw}$ is assumed to be constant. $Q_{dh}$ changes according to the seasonal variation in the outside temperature, so that a variable $Q_{dh,v}$ is introduced here.

The illustration of the calculation is based on a normal state of building use and quasistationary conditions. This means that the building users behave during the observation period as they always do. This applies to the inside temperatures, ventilation, hot water consumption, and internal heat gains. Quasistationary climatic conditions mean that no extreme external heat gains, temperature fluctuations or wind forces occur. In the non-stationary state, dynamic influences such as internal or solar heat sources, greatly fluctuating temperature, wind and moisture influences due to meteorological conditions, as well as the resulting storage effects of the building may no longer be ignored. In calculating the connected heating load using the system according to the present invention, a 15% increase $K_{WW}$, for example, may be provided across the board in the calculation for the hot water supply.

To further classify the connected heating load and, in part, also to ascertain the connected heating load itself, data of the building and system configuration are determined, for example:

Lowest two-day average (for example, −15° C. taken from a table ordered by zip codes)
Building-related data such as storage behavior, type of use, location (for example, apartment house, located on a slope, low-energy house).
Location of the heating system for taking radiation losses into account (for example, basement, inside/outside the thermal envelope)

Data on the heat generator, in particular the generation and transmission medium (for example, extra light heating oil; water or air)
Presence of a water heater (for example, yes)
Data on the burner, including details about its capacity (for example, 120 KW, extra light heating oil; no preheating)
Data on the burner air supply (for example, ambient air)
Data on the energy carrier (for example, extra light heating oil)
Data on the burner stages (for example, quantity 2, nozzle size 2.0 gph, pressures: 11 and 22 bar or 8 kg/h and 11 kg/h, respectively)

In the case of high precision measurement tasks, the use of additional flow sensors 15 (see FIG. 1) may be expedient which, in combination with existing sensors for flow and return flow temperatures, enable partial losses or correction values, i.e., of process water consumption quantities to be calculated during measured value acquisition. Flow sensors in the fuel supply system may also be used to ascertain fuel power values over time which are incorporated into the calculation process. For the purpose of synchronous and discrete automatic data acquisition, sensors are used to measure the following values at sampling times, for example at 10-second intervals over a 24-hour observation period:

| | |
|---|---|
| Waste gas temperature | $T_{waste\,gas}$ |
| $O_2$ (or $CO_2$) concentration | $O_{2meas}$ |
| CO concentration (optional) | $CO_{meas}$ |
| Combustion air temperature | $T_{air}$ |
| Outside temperature | $T_{outside,\,actual}$ |
| Inside temperature | $T_{inside}$ |

All data collected and measured are transmitted to the analyzer unit, any type of data transmission being possible. The actual calculation over the observation period (for example, 24 hours) comes next. The following are used as calculation variables:

| | |
|---|---|
| Daily performance, heat performance expended in the building | $Q_{d,\,actual}$ |
| Daily performance at design temperature | $Q_{d,\,max}$ |
| Instantaneous useful power of the burner | $P_{h,\,actual}$ |
| Connected heating load | P |

The calculation itself takes place as explained in greater detail below:

Calculation Step 1

Daily performance $Q_{d,\,actual}$ is first calculated at synchronously and discretely determined sampling times (for example 8640 within 24 hours) on the basis of the ascertained fuel power values of individual burner states $P_{Br,1,2}$, waste gas temperature $T_{waste\,gas}$, oxygen concentration $O_2$ (and/or carbon dioxide concentration $CO_2$), if applicable carbon monoxide concentration CO, combustion air temperature $T_{air}$, if applicable flow temperature $T_{flow,\,actual}$ and, if applicable, return flow temperature $T_{return\,flow,\,actual}$.

The ascertainment of the daily performance for process water heating $Q_w$ is explained in greater detail below in taking the hot water supply into account. Inside temperature $T_{inside,\,actual}$ and outside temperature $T_{outside,\,actual}$ are averaged from the synchronously and discretely determined sampling times. The fuel power is calculated, for example, from the variation over time of the heating system switching states (off, first stage on, second stage on) and the flow quantities for the first and second stages (known, ascertained or measured).

If $Q_{d,\,actual}$ is calculated, required heating performance $Q_{d,\,actual}$ is less than maximum heating performance $Q_{d,\,max}$ in the event that outside temperature $T_{outside,\,actual}$ is greater than $T_{outside,\,min}$, $$Q_{d,\,actual} < Q_{d,\,max},$$

or power requirement (heating power) $P_{h,\,actual}$ is less than maximum power requirement P, $$P_{h,\,actual} < P,$$

where $T_{outside,\,min}$ is defined as the lowest two-day average for the location concerned.

If $Q_{d,\,actual}$ is calculated via the data taken from the boiler, the following applies:

If $T_{inside,\,actual}$ is greater than $T_{outside,\,min}$, a continuous heat loss of the building occurs which must be equalized by supplying heat from the boiler via the heating system. In the event of a stationary state, this heat power loss is continuous.

If $T_{inside,\,actual}$ is equal to $T_{outside,\,min}$, heat is supplied continuously if the boiler is adjusted correctly to the connected heating load. When correctly dimensioned, the boiler operates continuously in nominal load mode without being shut down.

If $T_{outside,\,actual}$ is greater than $T_{outside,\,min}$, the heat loss performance of the building decreases. The boiler would have to adequately lower or modulate its power. However, this is possible only within certain limits in the case of new, correctly designed and adjusted systems.

Otherwise, this state causes an intermittent boiler behavior. While the heat loss performance of the building is being continuously produced, the burner is able to meet the reduced power requirements only if it works discontinuously, temporarily, in cycles or intermittently. The burner runtime is then less than 24 hours over the period of a day.

Boiler heating performance $Q_{d,\,actual}$ during the measurement period is the product of heating performance $P_{h,\,actual}$ and burner cycle runtime $t_{Br}$.

$$Q_{d,\,actual} = t_{Br} \cdot P_{h,\,actual}$$

where $t_{Br}$ is ascertained by concluding the state "burner on" ($O_2 < 21\%$) or "burner off" ($O_2 > 21\%$) from the different concentrations of $O_2$ (or $CO_2$) in the waste gas. In particular in the case of modulated burners, the variation over time of the waste gas temperature may be taken into account alternatively or in addition to ascertain the power decrease.

Following the preparatory calculation operation, the individual load stages are concluded from the different waste gas temperatures and $O_2$ or $CO_2$ concentrations, so that the state "burner on in load stage $P_{h,\,actual,\,stage}$" may be determined for the cycling burner.

The following is obtained for the intermittently operating boiler, assuming a constant efficiency $\eta_K$ in the event of quasistationary operation and known or ascertained fuel power $P_{Br}$:

$$P_{h,\,actual,\,stat} = P_{Br} \cdot \eta_K$$

The following applies in the case of operation in different load stages:

$$Q_{d,\,actual} = t_{Br,\,1} \cdot P_{h,\,actual,\,1} + t_{Br,\,2} \cdot P_{h,\,actual,\,2} + \cdots + t_{Br,\,n} \cdot P_{h,\,actual,\,n}$$

The following must be taken into account, however:

The boiler operates in different load states at different efficiencies. The burner startups in the initial phase are characterized by low efficiencies, and standby losses due to outflowing waste gas are recorded in the case of standstill- and safety-related boiler ventilation phases.

Radiation losses must also be included if the boiler is not located within the thermal envelope; the same is true for additional heat gains if the chimney is positioned inside the building. The boiler heating performance is determined as fuel performance $Q_{Br}$ minus all loss performances which occur. Incomplete combustion reduces efficiency, which is demonstrated by an elevated CO or HC concentration. Degree of utilization $\eta_N$ is defined on this basis. The correct calculation of $\eta_N$ requires additional calculation steps.

In this case, $$Q_{d,\,actual} = Q_{Br} \cdot \eta_N \text{ or}$$

$$Q_{d,\,actual} = Q_{Br} - Q_{loss}$$

According to the first German Federal Emission Protection Decree (1. BImSchV), $q_{wg}$ may be calculated according to the following approximation, where $T_{wg}$ represents the waste gas temperature, $T_{air}$ the combustion air temperature, $O_{2,\,meas}$ the oxygen concentration and Coeff $A_2$, Coeff B the coefficients dependent on the fuel used and taken from corresponding tables.

$$q_{wg} = (T_{wg} - T_{air}) \cdot ((\text{Coeff}\,A_2/(21 - O_{2meas})) + \text{Coeff}\,B)/100)$$

$$\eta_K = 1 - (T_{wg} - T_{air}) \cdot ((\text{Coeff}\,A_2/(21 - O_{2meas})) + \text{Coeff}\,B)/100)$$

This yields the following for the entire burner runtime in the quasistationary range:

$$Q_{d,\,stat} = t_{Br} \cdot P_{Br} \cdot (1 - (T_{wg} - T_{air}) \cdot ((\text{Coeff}\,A_2/(21 - O_{2meas})) + \text{Coeff}\,B)/100))$$

Calculation Step 2

The maximum daily performance for design point $Q_{d,\,max}$ is determined from the daily performance within observation period $Q_{d,\,actual}$. According to DIN 4701, the heating system must be dimensioned in such a way that the supplied heat is equal to the heat losses (transmission and ventilation) at the design temperature (lowest two-day average). To this is added a base amount for hot water. This situation is further influenced by wind load, external and internal heat sources, user behavior, i.e., individual setting of inside temperature, ventilation, and hot water consumption, as well as the building's storage capacity.

If it is not possible to ascertain the portion for process water heating, the base amount for process water heating is assumed in this case to be, for example, 15% of the heating demand, for reasons of simplification. Additional influences are ignored. However, a separate hot water measurement or production heat measurement may also be taken.

If the design temperature prevails, the power loss is equal to the useful thermal power to be produced, i.e., the daily loss performance is equal to the useful heat performance within a 24-hour period. In this case, the boiler runs continuously under nominal load. The fuel power is converted into thermal power, minus the efficiency.

According to the present invention, a method and a system are also provided to determine the required boiler power within the observation period (for example, 24 hours) even at outside temperatures which are higher than the design temperature. In this case, if the design temperature prevails, the maximum power, i.e., maximum daily performance $Q_{d,\,max}$, is needed, and the heating power is equal to zero if the inside temperature is equal to the outside temperature.

Figure 2:
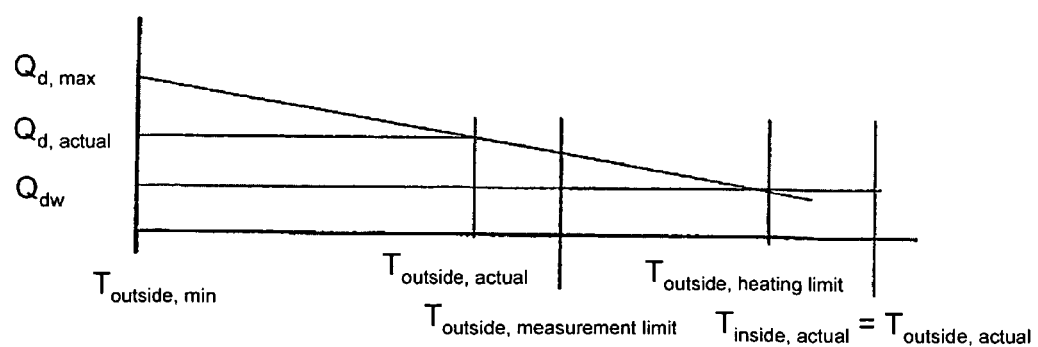
FIG. 2 shows the connection between the instantaneous temperature and the instantaneous heating power as well as the minimum temperature and the maximum heating power.

According to FIG. 2, a largely linear correlation results, a heat performance $Q_{d,\,actual}$ being required for one day at an average outside temperature $T_{outside,\ actual}$. The daily performance for process water heating $Q_{dw}$ is assumed to be constant.

The determination of point $(Q_{d,\ actual};\ T_{outside,\ actual})$ makes it possible to determine point $(Q_{d,\ max})$ at $T_{outside,\ min}$ via point $(T_{heating\ limit}$ or $T_{inside,\ actual}$=$T_{outside,\ actual})$.

$$Q_{d,\ max} = Q_{d,\ actual}(T_{heating\ limit} - T_{outside,\ min})/(T_{heating\ limit} - T_{outside,\ actual})$$

Taking the hot water supply into account, the following applies:

$$Q_{d,\ max} = Q_{d,\ actual}(T_{heating\ limit} - T_{outside,\ min})/(T_{heating\ limit} - T_{outside,\ actual}) - Q_{dw}(T_{heating\ limit} - T_{outside,\ min})/(T_{heating\ limit} - T_{outside,\ actual})$$

Calculation Step 3

Connected heating load P is determined as follows from maximum daily performance $Q_{d,\ max}$: The connected heating load corresponds to the maximum heating power needed to maintain the desired inside temperature and the desired hot process water quantity in the building at the outside temperature corresponding to the lowest two-day average and the average wind force typical for the location, thus equalizing the transmission heat losses, ventilation heat losses, and losses due to the outflowing hot process water.

Connected heating load P as the maximum power is calculated from daily performance $Q_{d,\ max}$ as:

$$P = Q_{d,\ max}/24$$

The burner power to be set must be increased by the efficiency and, if applicable, a safety value for process water heating $K_{WW}$:

$$P_{Br} = P/(1 - (T_{waste\ gas} - T_{air}) \cdot ((\text{Coeff}\ A_2/(21 - O_{2meas}) + \text{Coeff}\ B)/100)) + K_{WW}$$

$K_{WW}$=e.g. 15%

The way in which daily performance $Q_{d,\ actual}$, and thus connected heating load P, may be more precisely determined is described below. For this purpose, the losses during combustion in the quasistationary state as well as the startup losses are taken into account. In calculating these losses, the following assumptions are made as a computational linking of the measured data:

During the phase of the quasistationary state, combustion takes place in the normal range using quasi-constant parameters.

Boiler startups must be divided into cold starts and warm starts.

The standstill losses are equalized during the working phase at boiler startup, so that the performance needed for this compensation must be calculated.

Heat is transferred from the waste gas to the boiler water only if the waste gas temperature is measurably higher than the boiler water temperature.

The boiler water temperature is the average of the flow and return flow temperature, measured directly at the boiler inlet or outlet. If necessary, the measured value is detected on a boiler design basis.

Standby losses arise due to boiler startups and cause only the temperature of the boiler water itself to increase, but do not result in any heat input into the building. Heat input into the building takes place only when the temperature in the heating section increases measurably during a boiler cycle.

Radiation heat losses of the boiler occur when the boiler surface temperature is higher than the boiler ambient temperature, but are relatively low in new boilers, due to good insulation. However, if the boiler is located in the thermal envelope, this heat is not lost.

The calculation of daily performance $Q_{d,\ actual}$ is based on the following formula:

$$Q_{d,\ actual} = Q_{d,\ stat} - Q_{loss}(KS) - Q_{loss}(WS)$$

In this case $Q_{d,\ stat}$ represents the daily performance over the entire burner runtime in the quasistationary range, $Q_{loss}(KS)$ represents the heatup loss performance during the cold start phases and $Q_{loss}(WS)$ represents the heatup loss performance during the warm start phases.

Combustion during a boiler cycle in the quasistationary range takes place in the normal range of waste gas composition. This means that carbon monoxide as well as soot concentrations are negligible. During this operating phase, the waste gas temperature is higher than the boiler water temperature. The heat generated is therefore transferred to the boiler water.

Daily performance $Q_{d,\ stat}$ is calculated for the entire burner runtime in the quasistationary range according to the following formula:

$$Q_{d,\ stat} = \Sigma t_{Br} \cdot P_{Br} \cdot \eta_K$$

where $t_{Br}$ represents the burner runtime. Burner runtime $t_{Br}$ is ascertained by concluding the state "burner on" ($O_2$<21%) or "burner off" ($O_2$>21%) from the different concentrations of $O_2$ (or $CO_2$) in the waste gas. In the case of modulated burners in particular, the variation over time of the waste gas temperature may be taken into account alternatively or in addition to ascertain the power decrease. $\eta_K$ represents the boiler efficiency. The following applies to $\eta_K$:

$$\eta_K = 1 - q_{wg} - q_{CO} - q_{AStr}$$

Waste gas loss $q_{wg}$ is the loss due to the difference between the heat content of the waste gases in the chimney and the combustion air.

The loss due to uncombusted gases $q_{CO}$ is attributable, in principle, to the remaining CO and occurs in startup and shutdown phases as well as when burners are set incorrectly. Even low CO concentrations mean substantial energy losses. This loss is negligible in quasistationary operation.

The heat loss via the boiler surface $q_{AStr}$ must be taken into account as a significant factor, in particular in older boilers, and, if applicable, is incorporated into the calculation when the boiler is located outside the thermal envelope. If $q_{AStr}$ is ignored, the following applies to the further calculation of $Q_{d,\ stat}$:

$$\eta_K = 1 - q_{wg}$$

Pursuant to 1. BImSchV, $q_{wg}$ may be calculated according to the following approximation:

$$q_{wg} = (T_{wg} - T_{air}) \cdot ((\text{Coeff}\ A_2/(21 - O_{2meas}) + \text{Coeff}\ B)/100)$$

resulting in the following:

$$\eta_K = 1 - (T_{waste\ gas} - T_{air}) \cdot ((\text{Coeff}\ A_2/(21 - O_{2meas}) + \text{Coeff}\ B)/100)$$

yielding the following for the entire burner runtime in the quasistationary range:

$$Q_{d,\ stat} = t_{Br} \cdot P_{ur} \cdot (1 - (T_{waste\ gas} - T_{air}) \cdot ((\text{Coeff}\ A_2/(21 - O_{2meas}) + \text{Coeff}\ B)/100)$$

$T_{waste\ gas}$ corresponds to the waste gas temperature and $T_{air}$ to the temperature of the combustion air. Coeff $A_2$ and Coeff B are coefficients dependent on the fuel used and taken from corresponding tables. $O_{2meas}$ is the measured oxygen concentration.

The method for ascertaining heatup loss performance $Q_{loss}$ (KS) during the cold start phases of the heating system is described below:

A cold start phase is characterized by the fact that the waste gas temperature is lower than the boiler water temperature at the time of startup following a prolonged cooling phase. This applies to a cold start phase which initiates both a "heating cycle" and a "standby cycle."

In the case of heatup during cold start phases, the entire fuel performance is needed to return to the starting point at which heat is transferred from the waste gas to the boiler water. The fuel performance needed up to that point is included in the calculation of daily performance $Q_{d, actual}$ entirely as heatup loss performance $Q_{loss}$ (KS).

The calculation of $Q_{loss}$ (KS) is based on the following assumptions:

1. The heatup performance per cycle $Q_{cycle.heatup}$ is equal to boiler heatup loss performance $Q_{loss}$ (KS) per cycle.

$$Q_{cycle.heatup} = Q_{loss}(KS)$$

2. The average boiler water temperature is equal to the average of average flow temperature $T_{flow}$ and average return flow temperature $T_{return\ flow}$ within the measurement period. A cold start phase (heatup phase) $T_{heatup}$ for the "heating cycle" is ended when waste gas temperature $T_{waste\ gas}$ is greater than the average boiler water temperature. From this moment onward, the system delivers useful performance.

$$Q_{loss}(KS) = \Sigma t_{heatup}(T_{waste\ gas} < \tfrac{1}{2}(T_{flow} + T_{return\ flow})) \cdot P_{Br}$$

3. For the "standby cycle," cold start phase (heatup phase) $t_{heatup}$ corresponds to an entire cycle (10 seconds in this exemplary embodiment) if no significant increase in flow temperature $T_{flow}$ is detectable within the cycle. In this case, the heating system has not delivered any useful performance during this 10-second cycle.

$$Q_{loss}(KS) = \Sigma t_{heatup}(T_{flow} = \text{constant}) \cdot P_{Br}$$

The total fuel performance of the cold start phases $P_{Br} \cdot t_{heatup}$ may be used as a basis for calculating the heatup performance and thus heatup loss performance $Q_{loss}$ (KS).

$$Q_{loss}(KS) = \Sigma t_{heatup}(T_{waste\ gas} < \tfrac{1}{2}(T_{flow} + T_{return\ flow}); (T_{flow} = \text{constant})) \cdot P_{Br}$$

The heat-up loss performance during the cold start phases is calculated from the sum of the products of the cold start phase cycle times of heatup and fuel power $P_{Br}$. The calculation of heatup loss performance $Q_{loss}$ (WS) during the warm start phases of the heating system is explained below:

It should be noted that it is desirable to take into account the fact that, during a warm start phase, the waste gas temperature is higher than the boiler water temperature at the time the heating system is started up.

In the segment belonging to the startup phase, the portions of the waste gas loss due to incomplete combustion and uncombusted fuel are much greater than the purely temperature-related waste gas loss, which means that the uncombusted components must be included in any calculation of efficiency.

The incomplete combustion is detectable and measurable on the basis of the CO concentration contained in the waste gas flow. The further possible portion due to combustible residue (soot) may be ignored. The additional losses due to incompletely combusted fuel $\eta_{loss(CO)}$ may therefore be taken into account for the warm start.

Due to the high heating value of CO, CO concentrations already contribute to heat losses. The following applies to the calculation of loss due to uncombusted gases:

| | |
|---|---|
| $q_u =$ | $(V_{Atr} \cdot H_{u,\ CO} \cdot CO)/H_u$, where $H_u$ is in % |
| $H_{u,\ CO} =$ | Heating value of CO in kJ/m$^3$ |
| $H_u =$ | Heating value of fuel in kJ/m$^3$ |
| $V_{Atr} =$ | Dry waste gas volume in m$^3$ |
| $CO =$ | Volumetric concentration of CO in mg/m$^3$ | or for efficiency:

$$\eta_{loss(CO)} = 1 - q_u$$

The loss due to uncombusted gases during burner startup then amounts to:

$$Q_{loss,\ start}(WS) = \Sigma t_{start}(CO_{waste\ gas} > 0.1\%) P_{Br} \cdot \eta_{loss(CO)})$$

During measured value acquisition, all CO values greater than 0.1% are recorded as calculation variables. In a further simplification, it is assumed that the CO peaks have a quasi-identical curve and the shape of a right-angled triangle, as shown above. The loss for $CO_{waste\ gas} > 0.1\%$ may then be calculated approximately as follows:

$$q_u = (V_{Atr} \cdot H_{u,\ CO} \cdot \tfrac{1}{2} CO_{waste\ gas,\ max})/H_u, \text{ where } H_u \text{ is in \%}$$

$$\eta_{loss(CO)} = 1 - q_u$$

$$Q_{loss,\ start}(WS) = \Sigma t_{start}(CO_{waste\ gas} > 0.1\%) P_{Br} \cdot \eta_{loss(CO)})$$

The preliminary considerations yield the following for calculating daily performance $Q_d$:

$$Q_{d,\ actual} = \Sigma (t_{Br,1"n"} P_{Br,1"n"} (1 - (T_{waste\ gas} - T_{air}) \cdot ((\text{Coeff } A_2/(21 - O_{2meas}) + \text{Coeff } B)/100)))$$

$$- \Sigma t_{heatup}(T_{waste\ gas} < \tfrac{1}{2}(T_{flow} + T_{return\ flow})) P_{Br}$$

$$- \Sigma t_{standby}(T_{flow} = \text{const.}) \cdot P_{Br}$$

$$- \Sigma t_{start}(CO_{waste\ gas} > 0.1\%) \cdot P_{Br} \cdot ((1 - V_{Atr} \cdot H_{u,\ CO} \cdot \tfrac{1}{2} CO_{waste\ gas,\ max})/H_u)$$

As explained above in connection with the simplified calculation example, maximum daily performance $Q_{d,\ max}$ is determined from daily performance $Q_{d,\ actual}$. Connected heating load P is subsequently calculated from maximum daily performance $Q_{d,\ max}$, yielding $P = Q_{d,\ max}/24$.

For reasons of clarity, the performance for hot water preparation $Q_{d,\ w}$ on a single day was initially left out of the daily performance calculation according to the previously described example, and thus also that of the connected heating load. In a simplified method, the performance for hot water preparation may be assumed to be constant and added to the calculated daily performance.

In an embodiment of the present invention, the quantity of condensate within the measurement cycle may be determined for the purpose of determining the additional heat input due to the calorific value effect in heat generation by a condensing boiler, and additional heat obtained via formation of condensate may be taken into account by the calorific value utilization.

If the formation of condensate is not determined within the measurement cycle, the sensor system enables the calorific value effect to be evaluated in heating systems. This evaluation is useful for both condensing systems (desired effect) and standard systems (unwanted effect).

The following variables are measured, in particular, at synchronously and discretely determined sampling times during burner operation:

| Oxygen concentration | $O_{2averaged}$ | in % |
|---|---|---|
| Waste gas temperature | $T_{waste\ gas}$ | in ° C. |
| Return flow temperature | $T_{return\ flow}$ | in ° C. |

Waste gas water vapor dew point $T_{boil}$ may be ascertained from the oxygen concentration. At each sampling time, the variables $T_{boil}$, $T_{return\ flow}$, $T_{waste\ gas}$ are related to each other during burner operation. The following applies to the occurrence of the calorific value effect:

$$T_{return\ flow} < T_s$$

including the boundary condition (assumption by way of example):

$$T_{return\ flow} + 15K < T_{waste\ gas}$$

The time portion of the calorific value effect during burner operation within the measurement cycle may be concluded by comparing the measured variables. If a condensing boiler is used, this makes it possible to assess the correctness of the design and regulating system. If a standard boiler is used, the occurrence of the calorific value effect is unwanted and points to possible damage.

Furthermore, the share of heating performance for process water heating during the measurement cycle may first be determined directly via the measurement system described if the measurements are taken while the heating system is turned off. This situation may be induced or occur when the outside temperature is higher than the heating limit. In this case, the entire heating performance is used for process water heating. The heating performance may also be ascertained for process water heating if a process water tank is present (usually the case) by placing the size of the tank, number of filling cycles during the measurement cycle and the respective temperature increases in relation to one another.

If the measurements are taken on an object at different outside temperatures, such as:

$1^{st}$ measurement: $T_{outside,\ min} < T_{outside.meas,\ 1} < -5°$ C.;

$2^{nd}$ measurement: $0°$ C. $< T_{outside.meas,\ 2} < 8°$ C.;

$3^{rd}$ measurement: $T_{outside,\ heating\ limit} < T_{outside.meas,\ 3}$, $T_{outside.meas,3}$ both the connected heating load and the building-specific heating limit may be calculated, as described above, by determining the building characteristic. Building-specific heating limit temperature $T_{heating\ limit}$ is determined by the point of intersection of the line for the outside temperature-dependent daily thermal performance and the line for the outside temperature-dependent daily performance for process water heating.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for determining a connected heating load of a building heated by a heating system, the heating system being fired by fuel in a waste gas-generating manner, and an outside temperature as well as an inside temperature occurring for the building, comprising the following steps:

determining fuel power, inside temperature, and combustion air temperature over time in each case within an observation period of a certain observation duration;

measuring waste gas concentration parameters, waste gas temperature, and outside temperature over time in each case within the observation period;

ascertaining an efficiency of the heating system over time from the waste gas concentration parameters, the waste gas temperature, and the combustion air temperature over time in each case within the observation period;

ascertaining an average outside temperature and an average inside temperature within the observation period from the outside temperature and the inside temperature;

ascertaining an average heating performance produced at the average outside temperature from the fuel power over time and the efficiency of the heating system over time within the observation period;

ascertaining a maximum heating performance to be produced at a minimum outside temperature from the average heating performance, the minimum outside temperature, the average inside temperature, and the average outside temperature within the observation period; and ascertaining the connected heating load of the building from the maximum heating performance and the observation duration.

2. The method as recited in claim 1, wherein oxygen concentration in the waste gas is measured as a waste gas concentration parameter.

3. The method as recited in claim 1, wherein the average heating performance is ascertained from the product, integrated over the observation period, of fuel power over time and efficiency over time.

4. The method as recited in claim 1, wherein the average efficiency within the observation period and the average fuel power are ascertained for the purpose of ascertaining the average heating performance, the average efficiency and average fuel power subsequently being multiplied by each other as well as by the observation duration.

5. The method as recited in claim 1, wherein the maximum heating performance is calculated on the basis of the equation $Q_{heating,\ max} = Q_{heating,\ average} (T_{heating\ limit} - T_{outside,\ min}) / T_{heating\ limit} - T_{outside,\ average})$, $Q_{heating,\ max}$ representing the maximum heating performance, $Q_{heating,\ average}$ the average heating performance within the observation period, $T_{heating\ limit}$ the heating limit temperature, $T_{outside,\ min}$ the minimum outside temperature and $T_{outside,\ average}$ the average outside temperature, measured to determine the connected heating load within the observation period.

6. The method as recited in claim 1, wherein the connected heating load P is calculated on the basis of the equation $P = Q_{heating,\ max} / \tau$, $Q_{heating,\ max}$ representing the maximum heating performance and $\tau$ the observation duration.

7. The method as recited in claim 1, wherein multiple measurements are carried out at different outside temperatures.

8. The method as recited in claim 1, wherein the heating system has a hot process water supply, a correction value corresponding to the heating performance for the hot process water supply being subtracted from the average heating performance to determine the connected heating load, and this correction value being added again for calculating the maximum heating performance.

9. The method as recited in claim 1, wherein the inside temperature is measured over time within the observation period, and the outside temperature is equated with the average inside temperature within the observation period to establish the heating limit.

10. The method as recited in claim 1, wherein at least the waste gas temperature and outside temperature are measured synchronously and discretely at certain sampling times.

11. The method as recited in claim 1, wherein, to determine the efficiency $\eta_K$, at least one of radiation energy losses and convection energy losses and waste gas energy losses and energy losses are taken into account on the basis of uncombusted gases for calculating the average heating performance $Q_{d,\ stat}$ for the entire burner runtime in the quasistationary range.

12. The method as recited in claim 1, wherein the burner power to be set is ascertained from the connected heating load and efficiency as an additional step.

13. The method as recited in claim 1, wherein a portion of the measured values is measured discontinuously and combined with a portion of the measured values readable from the heating system itself.

14. The method as recited in claim 1, wherein a portion of the measured values is measured continuously and combined with a portion of the measured values readable from the heating system itself.

15. The method as recited in claim 1, wherein the heating performance for process water is ascertained and taken into account while the heating system is turned off.

16. The method as recited in claim 1, wherein the heating performance for process water heating within measurement cycle $Q_{d,\ w}$ is taken into account via the process water tank load by metrological detection of the tank filling times via the variation in flow and return flow temperatures of the tank filling circuit, the temperature rise in the tank via the difference in the return flow temperature per tank load, and linking the variables with the tank volume.

17. The method as recited in claim 1, wherein a building-specific heating limit temperature is determined by determining the building characteristic using multiple measurements at different outside temperatures.

18. The method as recited in claim 1, wherein the maximum heating performance is calculated on the basis of the equation $Q_{heating,\ max} = Q_{heating,\ average}(T_{heating\ limit} - T_{outside,\ min})/T_{heating\ limit} - T_{outside,\ average})$, $Q_{heating,\ max}$ representing the maximum heating performance, $Q_{heating,\ average}$ the average heating performance within the observation period, $T_{heating\ limit}$ the heating limit temperature, $T_{outside,\ min}$ the minimum outside temperature and $T_{outside,\ average}$ the average outside temperature, measured to determine the connected heating load within the observation period, wherein the heat input into the building from external and internal heat sources is ascertained and taken into account, and wherein multiple measurements are carried out at different outside temperatures.

19. The method as recited in claim 1, wherein the instantaneous fuel flow is measured, and the fuel performance is ascertained therefrom within the observation period.

20. The method as recited in claim 19, wherein the fuel performance is ascertained according to the equation $Q_{Br,\ actual} = H_U V_{BG}$, $Q_{Br,\ actual}$ representing the fuel performance, $H_U$ the fuel-dependent heating value and $V_{BG}$ the fuel flow.

21. The method as recited in claim 1, wherein at least one of the process water consumption quantity and the fuel flow is/are measured by flow sensors.

22. The method as recited in claim 21, wherein at least one of partial losses and correction values are calculated from at least one of the process water consumption quantity and fuel flow, in combination with the flow and return flow temperature variation of a tank filling circuit.

23. The method as recited in claim 1, wherein the observation duration is 24 hours or an integral multiple of 24 hours.

24. The method as recited in claim 23, wherein the observation duration is 168 hours.

25. The method as recited in claim 23, wherein the observation duration is less than 24 hours, and at least a portion of the measured values is extrapolated to an observation duration of 24 hours.

26. The method as recited in claim 1, wherein the heat input into the building from external and internal heat sources is ascertained and taken into account.

27. The method as recited in claim 26, wherein heat input into the building achieved by the calorific value effect during heat generation is ascertained and taken into account by determining the amount of condensate.

28. The method as recited in claim 27, wherein the calorific value effect during heat generation is ascertained and taken into account by determining the variables of oxygen concentration, return flow temperature and waste gas temperature.

29. The method as recited in claim 1, wherein the heating system is cycled, at least one of the variation over time and the instantaneous values of waste gas concentration parameters and the waste gas temperature being used to determine whether or not the burner is currently in operation.

30. The method as recited in claim 29, wherein, within the observation period, the switch-on times of the burner having the instantaneous fuel power are linked to the fuel performance resulting for the observation period.

31. The method as recited in claim 29, wherein the heating system has at least two combustion stages having different fuel powers, at least one of the variation over time and the instantaneous values of waste gas concentration parameters and the waste gas temperature being used to determine which of the at least two combustion stages is currently in operation and which fuel power must be currently applied in determining the connected heating load.

32. The method as recited in claim 31, wherein the different burner stages are taken into account in ascertaining the fuel power.

33. The method as recited in claim 1, wherein carbon dioxide concentration in the waste gas is measured and evaluated as a waste gas concentration parameter.

34. The method as recited in claim 33, wherein the efficiency $\eta_K$ of the heating system is ascertained on the basis of a country-specific equation.

35. The method as recited in claim 34, wherein a correction value, which is dependent on the operating behavior of the heating system as well as its place and type of installation, is subtracted from the ascertained efficiency.

36. The method as recited in claim 34, wherein the efficiency $\eta_K$ of the heating system is ascertained on the basis of the equation $$\eta_K = 1 - (T_{waste\ gas,\ actual} - T_{air,\ actual}) \cdot ((\text{Coeff } A_2/(21 - O_{2,\ meas}) + \text{Coeff } B/100), O_{2meas}$$

representing the instantaneous oxygen concentration in the waste gas, $T_{waste\ gas,\ actual}$ the instantaneous waste gas temperature, $T_{air,\ actual}$ the instantaneous combustion air temperature and Coeff $A_2$, Coeff B fuel-dependent coefficients characterizing the fuel power.

37. The method as recited in claim 36, wherein oil or gas is provided as the fuel, a value between 0.63 and 0.68 is selected for the coefficient Coeff $A_2$, and a value between 0.007 and 0.011 is selected for the coefficient Coeff B.

38. The method as recited in claim 1, wherein the heating performance $Q_{d,\ actual}$ is determined within the observation period by subtracting the entire loss performance $Q_{v,\ d}$ from the fuel performance $Q_{Br,\ d}$.

39. The method as recited in claim 38, wherein a component of the loss performance $Q_{v,\ d}$ is the heatup loss performance $Q_{loss}$ (KS) during the cold start phases of the heating system.

40. The method as recited in claim 38, wherein a component of the loss performance $Q_{v,\ d}$ is the heatup loss performance $Q_{loss}$ (WS) during the warm start phases of the heating system.

41. The method as recited in claim 38, wherein a component of the loss performance $Q_{v,\ d}$ is formed by at least one of standby losses and waste gas losses in the quasistationary range and radiation losses.

42. The method as recited in claim 38, wherein the loss performance $Q_{v,\ d}$ is the sum of the heatup loss performance $Q_{loss}$ (KS) during a cold start and the heatup loss performance $Q_{loss}$ (WS) during a warm start of the heating system.

43. A system for determining the connected heating load of a building heated by a heating system, comprising
- a data acquisition device for detecting fuel power, inside temperature and combustion air temperature over time in each case within an observation period of a certain observation duration;
- a measuring device for measuring at least the waste gas concentration parameters, waste gas temperature and outside temperature over time in each case within the observation period; and
- an analyzer unit for ascertaining the efficiency of the heating system over time from the waste gas concentration parameters, the waste gas temperature, and the combustion air temperature over time in each case within the observation period; for ascertaining an average outside temperature within the observation period; for ascertaining an average heating performance produced at the average outside temperature from the fuel power over time and the efficiency of the heating system over time within the observation period; for ascertaining a maximum heating performance to be produced at a minimum outside temperature from the average heating performance, a minimum outside temperature, an average inside temperature and the average outside temperature within the observation period; for ascertaining the connected heating load of the building from the maximum heating performance and the observation duration.

44. The system as recited in claim 43, wherein the analyzer unit ascertains the burner power to be set from the connected heating load and the efficiency.

45. The system as recited in claim 43, wherein the measuring device has a memory for buffering measured data.

46. The system as recited in claim 43, wherein multiple measuring devices are provided which transmit data to the analyzer unit, these measuring devices each having their own data memory for the purpose of collecting the data separately and buffering it for further evaluation.

47. The system as recited in claim 43, wherein at least the waste gas temperature and outside temperature are measured synchronously and discretely at certain sampling times.

48. The system as recited in claim 43, wherein the measuring device and analyzer unit are spatially separated from each other and each have an interface for transmitting data, wherein the interfaces operate wirelessly, and wherein multiple measuring devices are provided which transmit data to the analyzer unit, these measuring devices each having their own data memory for the purpose of collecting the data separately and buffering it for further evaluation.

49. The system as recited in claim 43, wherein the measuring device and analyzer unit are spatially separated from each other and each have an interface for transmitting data.

50. The system as recited in claim 49, wherein the interfaces operate wirelessly.

51. A method for determining the degree of utilization of a heating system, the heating system being fired by fuel in a waste gas-generating manner, comprising the following steps:
- determining fuel power and combustion air temperature over time in each case within an observation period of a certain observation duration;
- measuring waste gas concentration parameters and waste gas temperature over time in each case within the observation period; and
- ascertaining the efficiency of the heating system over time from the waste gas concentration parameters, the waste gas temperature and the combustion air temperature over time in each case within the observation period.

* * * * *